United States Patent
Gudapati et al.

(10) Patent No.: US 12,341,203 B2
(45) Date of Patent: Jun. 24, 2025

(54) HIGH VOLTAGE BATTERY CONTACTOR WELDING PREVENTION

(71) Applicant: FCA US LLC, Auburn Hills, MI (US)

(72) Inventors: Abhilash Gudapati, Troy, MI (US); Zhentao Xie, Auburn Hills, MI (US); Rudolf Kharpuri, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 461 days.

(21) Appl. No.: 17/957,022

(22) Filed: Sep. 30, 2022

(65) Prior Publication Data

US 2024/0113364 A1    Apr. 4, 2024

(51) Int. Cl.
*H02J 7/00* (2006.01)
*B60L 50/10* (2019.01)
*H01M 50/169* (2021.01)

(52) U.S. Cl.
CPC .......... *H01M 50/169* (2021.01); *B60L 50/10* (2019.02)

(58) Field of Classification Search
None
See application file for complete search history.

(56) References Cited

U.S. PATENT DOCUMENTS

| | | | | |
|---|---|---|---|---|
| 5,705,859 | A | * | 1/1998 | Karg ....................... B60L 50/40 180/65.245 |
| 8,186,466 | B2 | | 5/2012 | Verbrugge et al. |
| 8,534,400 | B2 | | 9/2013 | Stanek et al. |
| 9,350,187 | B2 | | 5/2016 | Shreevani et al. |
| 10,014,702 | B2 | * | 7/2018 | Vogel ................... G01R 31/367 |

FOREIGN PATENT DOCUMENTS

JP        5038874 B2    10/2012

* cited by examiner

*Primary Examiner* — Arun C Williams
(74) *Attorney, Agent, or Firm* — Jeremy J. Klobucar

(57) ABSTRACT

High voltage battery contactor welding prevention techniques for an electrified vehicle include, in response to a request to perform a high voltage connection procedure, utilizing a supervisory controller to monitor a voltage of the low voltage battery system to determine whether a low voltage battery system of the vehicle has a voltage level sufficient to open/hold the set of contactors during the high voltage connection procedure, when the low voltage battery system has sufficient voltage, commanding by the supervisory controller to a sub-controller to perform the high voltage connection procedure, and when the low voltage battery system does not have sufficient voltage, displaying a low voltage indicator for a user to recharge the low voltage battery system before the high voltage connection procedure can occur.

18 Claims, 3 Drawing Sheets

HIGH VOLTAGE BATTERY CONTACTOR WELDING PREVENTION

FIELD

The present application generally relates to electrified vehicles (EVs) and, more particularly, to techniques for preventing high voltage battery contactor welding.

BACKGROUND

An electrified vehicle (EV) typically comprises both a high voltage battery and a traditional low voltage (e.g., 12 volt) battery. The high voltage battery is typically disconnected from a high voltage bus by opening one or more contactors to isolate the high voltage battery. The high voltage battery is then connected by closing the one or more contactors for various uses, such as powering electric motor(s) for vehicle propulsion, recharging, thermal conditioning, and the like. This process entails first closing a pre-charge contactor, and then beginning to close a positive contactor. When the high voltage bus becomes close to the battery pack's voltage, the negative contactor begins to close, and then the pre-charge contactor starts to open. However, when the low voltage (e.g., 12V) battery power is low, the closing procedure is still able to be completed, but as the low voltage continues dropping, the high voltage bus fluctuates. Accordingly, while such conventional EV contactor control systems do work for their intended purpose, there exists an opportunity for improvement in the relevant art.

SUMMARY

According to one example aspect of the invention, a high voltage battery contactor welding prevention system for an electrified vehicle is presented. In one exemplary implementation, the contactor welding prevention system comprises: a monitoring system configured to monitor a voltage of a low voltage battery system of the vehicle, the low voltage battery system being connected to a high voltage bus associated with a high voltage battery system through a DC-DC converter, and a supervisory controller configured to detect a request to perform a high voltage connection procedure where the high voltage battery system that is disconnected by a set of contactors each in an open state is subsequently connected to the high voltage bus, in response to detecting the request, utilize the monitoring system to determine whether the low voltage battery system has a voltage level sufficient to open/hold the set of contactors during the high voltage connection procedure, when the low voltage battery system has sufficient voltage, command a sub-controller to perform the high voltage connection procedure by (i) closing and holding close a pre-charge contactor for a period, (ii) closing a positive contactor, (iii) closing a negative contactor when the high voltage bus approaches the voltage level of the high voltage battery system, and (iv) then opening the pre-charge contactor, and when the low voltage battery system does not have sufficient voltage, display a low voltage indicator for a user to recharge the low voltage battery system before the high voltage connection procedure can occur.

In some implementations, the supervisory controller determination of whether or not to perform the high voltage connection procedure based on the monitoring of the voltage level of the low voltage battery system prevents voltage fluctuations and current spikes that could cause one or more of the contactors to weld closed thereby rendering the electrified vehicle inoperable. In some implementations, the low voltage battery system does not include separate, on-board control logic for preventing the voltage fluctuations and current spikes that could cause one or more of the contactors to weld closed. In some implementations, the supervisory controller is configured to determine that the voltage level is sufficient to open/hold the set of contactors during the high voltage connection procedure by determining that the voltage level is greater than a first voltage threshold and can be maintained for a first period. In some implementations, the supervisory controller is configured to determine that the voltage level is sufficient to open/hold the set of contactors during the high voltage connection procedure by determining that the voltage level is greater than a lesser second voltage threshold and can be maintained for a longer second period.

In some implementations, the low voltage battery system is a 12 volt (V) battery system, and wherein the first and second voltage thresholds are 11.5 V and 10.2 V, respectively. In some implementations, the first and second periods are 100 milliseconds (ms) and 200 ms, respectively. In some implementations, the supervisory controller is configured to display the low voltage indicator by illuminating a respective low voltage lamp/light on a dash or driver interface of the electrified vehicle. In some implementations, the request to connect the high voltage battery system corresponds to a request for one of (i) powering one or more electric motors for vehicle propulsion, (ii) recharging the high voltage battery system, and (iii) thermal conditioning of the high voltage battery system and/or a cabin environment of the electrified vehicle.

According to another example aspect of the invention, a high voltage battery contactor welding prevention method for an electrified vehicle is presented. In one exemplary implementation, the method comprises: detecting, by a supervisory controller of the vehicle, a request to perform a high voltage connection procedure where a high voltage battery system of the vehicle that is disconnected by a set of contactors each in an open state is subsequently connected to a high voltage bus that is also connected to a low voltage battery system of the vehicle through a DC-DC converter, in response to detecting the request, utilizing, by the supervisory controller, a monitoring system configured to monitor a voltage of the low voltage battery system to determine whether a low voltage battery system of the vehicle has a voltage level sufficient to open/hold the set of contactors during the high voltage connection procedure, when the low voltage battery system has sufficient voltage, commanding, by the supervisory controller to a sub-controller, the high voltage connection procedure by (i) closing and holding close a pre-charge contactor for a period, (ii) closing a positive contactor, (iii) closing a negative contactor when the high voltage bus approaches the voltage level of the high voltage battery system, and (iv) then opening the pre-charge contactor, and when the low voltage battery system does not have sufficient voltage, displaying, by the supervisory controller, a low voltage indicator for a user to recharge the low voltage battery system before the high voltage connection procedure can occur.

In some implementations, the supervisory controller determination of whether or not to perform the high voltage connection procedure based on the monitoring of the voltage level of the low voltage battery system prevents voltage fluctuations and current spikes that could cause one or more of the contactors to weld closed thereby rendering the electrified vehicle inoperable. In some implementations, the low voltage battery system does not include separate, on-board control logic for preventing the voltage fluctuations and current spikes that could cause one or more of the contactors to weld closed. In some implementations, the supervisory controller is configured to determine that the voltage level is sufficient to open/hold the set of contactors during the high voltage connection procedure by determining that the voltage level is greater than a first voltage threshold and can be maintained for a first period. In some implementations, the supervisory controller is configured to determine that the voltage level is sufficient to open/hold the set of contactors during the high voltage connection procedure by determining that the voltage level is greater than a lesser second voltage threshold and can be maintained for a longer second period.

In some implementations, the low voltage battery system is a 12 volt (V) battery system, and wherein the first and second voltage thresholds are 11.5 V and 10.2 V, respectively. In some implementations, the first and second periods are 100 milliseconds (ms) and 200 ms, respectively. In some implementations, the supervisory controller is configured to display the low voltage indicator by illuminating a respective low voltage lamp/light on a dash or driver interface of the electrified vehicle. In some implementations, the request to connect the high voltage battery system corresponds to a request for one of (i) powering one or more electric motors for vehicle propulsion, (ii) recharging the high voltage battery system, and (iii) thermal conditioning of the high voltage battery system and/or a cabin environment of the electrified vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, an electrified vehicle (EV) typically comprises both a high voltage battery and a traditional low voltage (e.g., 12 volt) battery. The high voltage battery is typically disconnected from a high voltage bus by opening one or more contactors to isolate the high voltage battery. There exists an opportunity for improvement in the art of EV high voltage battery contactor control systems and methods (e.g., contactor welding prevention). The conventional high voltage battery connection process entails first closing a pre-charge contactor, and then beginning to close a positive contactor. When the high voltage bus becomes close to the battery pack's voltage, the negative contactor begins to close, and then the pre-charge contactor starts to open. However, when the low voltage (e.g., 12V) battery power is low, the closing procedure is still able to be completed, but as the low voltage continues dropping, the high voltage bus fluctuates during the process. In this event, there is not enough energy to hold all three contactors so that the negative contactor is not able to stay closed, then as the pre-charge contactor is subsequently opened, the following results. More specifically, this results in a large voltage gap between the battery and the bus, and an instantaneous huge spike of current that could cause the contactors to inadvertently weld.

If the contactors inadvertently weld, the EV cannot be used for propulsion and would require an expensive high voltage battery back replacement that in turn increases warranty costs. One potential solution to this problem is to include control/prevention logic at the battery pack side/level (e.g., on-board as part of the battery pack control system). The primary drawback to this solution, however, is the need for battery pack suppliers to include such control/prevention logic, which increases costs and complexity. As a result, a high-level (supervisory-based) software approach for preventing high voltage battery contactor welding is presented herein. Before commanding the contactors to close, the supervisory controller will check the 12V battery voltage from different sensors for an amount of time, but as quickly as possible (e.g., ~ two seconds after start-up) to confirm its capability to close and hold all three contactors. The voltage checking/monitoring time could vary for different voltage levels (e.g., multiple voltage thresholds) and for whether different particular voltage levels are capable of being held for different periods/durations. Potential benefits include the ability to use any suitable battery pack without the above-described on-board logic, which increases flexibility and potentially decreases costs. These techniques are also applicable over a wide array of different EV applications.

Figure 1:
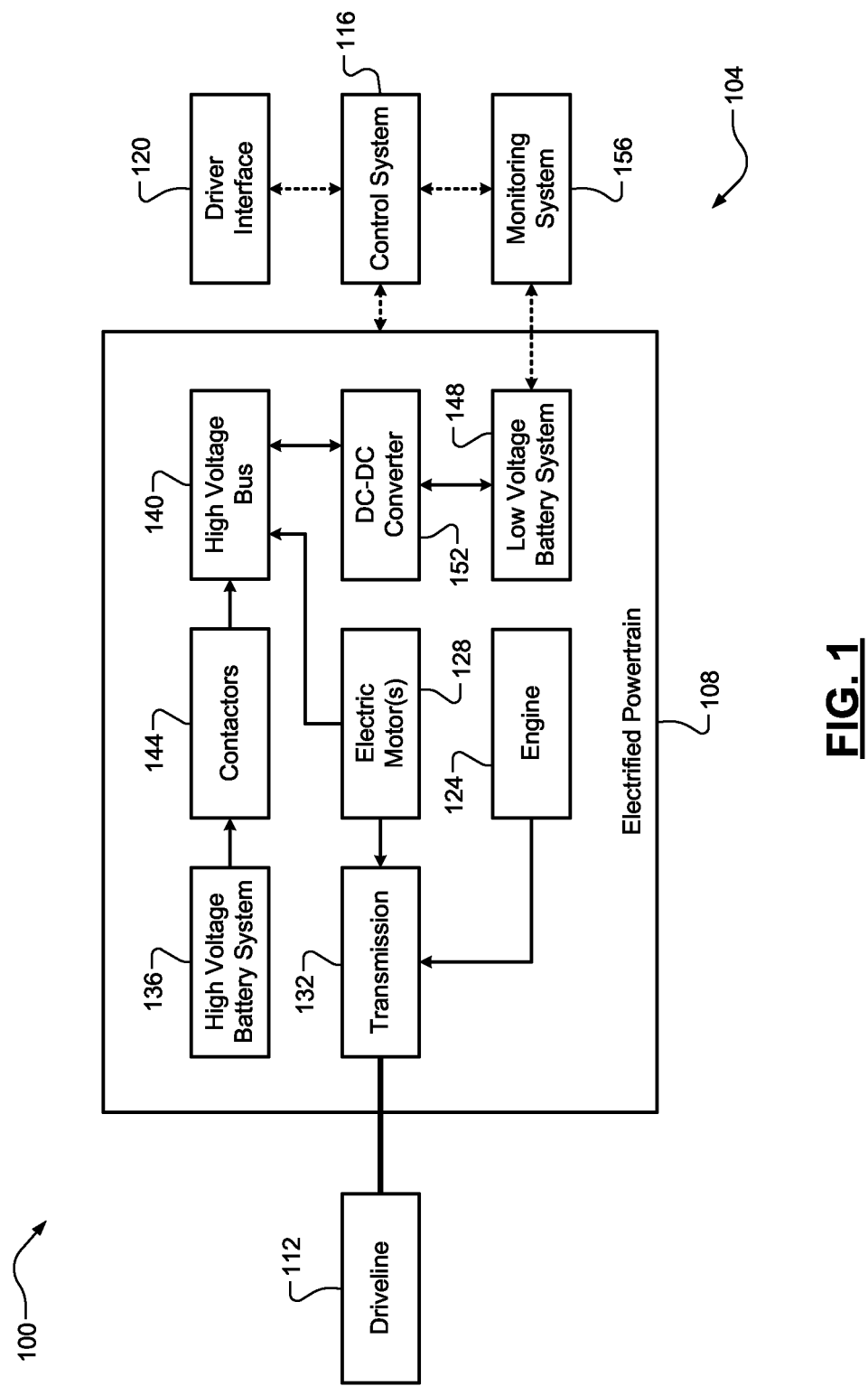
FIG. 1 is a functional block diagram of an electrified vehicle having an example high voltage battery contactor welding prevention system according to the principles of the present application.

Referring now to FIG. 1, a functional block diagram of an electrified vehicle 100 having an example high voltage battery welding prevention system 104 according to the principles of the present application is illustrated. The vehicle 100 comprises an electrified powertrain 108 configured to generate and transfer drive torque to a driveline 112 for vehicle propulsion. A control system 116 is configured to control the electrified powertrain 108, such as to generate a desired amount of drive torque to satisfy a driver torque request received via a driver interface 120 (e.g., an accelerator pedal) and based on torque-related parameters. The electrified powertrain 108 comprises an optional internal combustion engine 124 configured to combust a mixture of air and fuel (e.g., gasoline) to generate drive torque at a crankshaft (not shown). The electrified powertrain 108 also comprises one or more electric motors 128 configured to, when operating as torque generators, generate drive torque using electrical energy from a high voltage battery system 136. It will be appreciated that the electrified vehicle 100 could have any suitable powertrain configuration (e.g., BEV). The drive torque from the electric motor(s) 128 and the optional engine 124 is transferred to the driveline 112 via a transmission 132. The electrified powertrain 108 further comprises a low voltage (e.g., 12V) battery system 148 that is connected directly or via a DC-DC converter 152 to a high voltage bus 140, which is also electrically isolated from the high voltage battery system 136 from a set of contactors 144.

Figure 2:
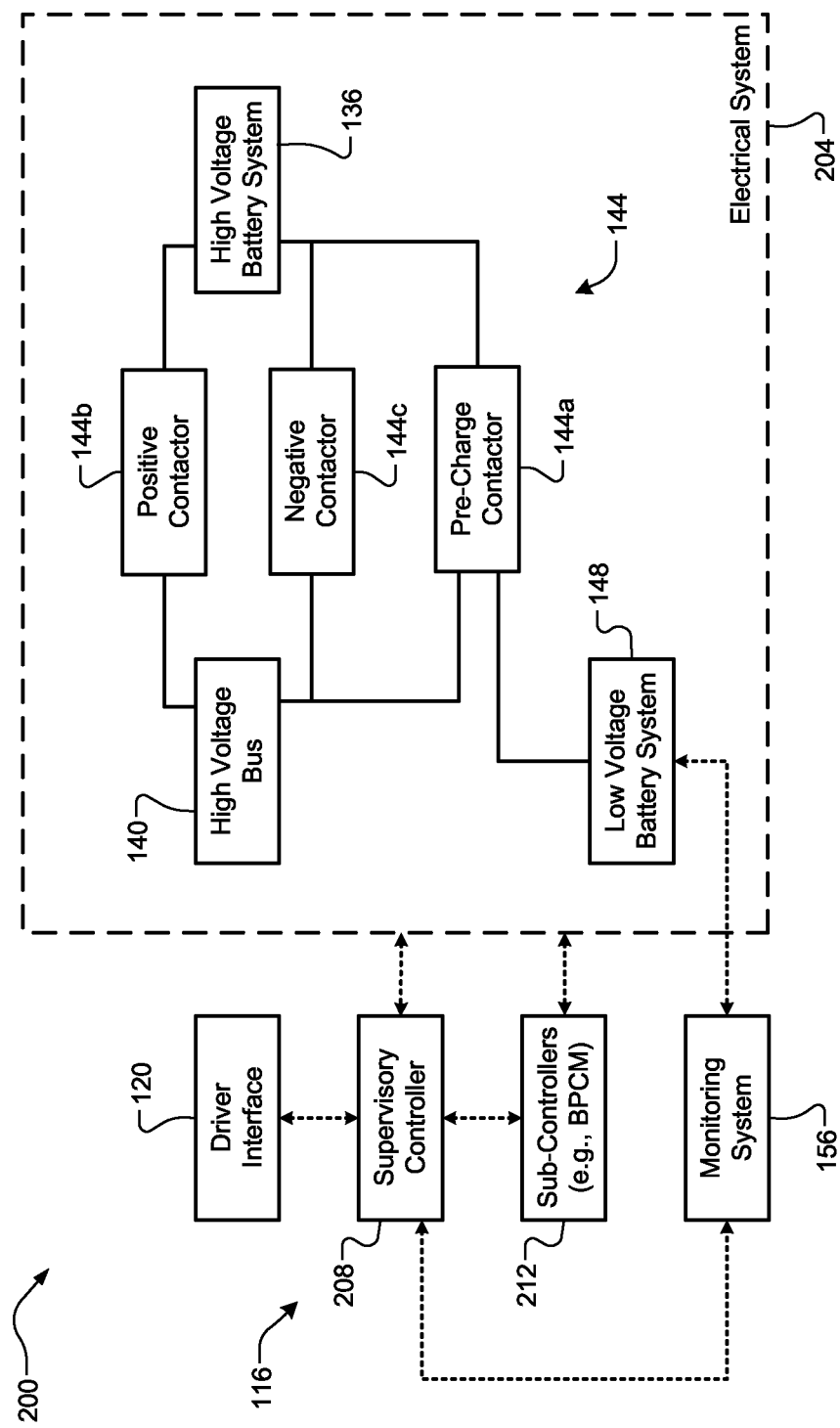
FIG. 2 is a functional block diagram of an example architecture for the high voltage battery contactor welding prevention system according to the principles of the present application.

Referring now to FIG. 2, a functional block diagram of an example architecture 200 for the high voltage battery welding prevention system 104 according to the principles of the present application is illustrated. It will be appreciated that this is merely one exemplary configuration of the high voltage battery welding prevention system 104 and other (i.e., non-battery side) implementations could be utilized. The architecture 200 illustrates a portion of an electrical system 204 of the vehicle 100 and a supervisory controller 208 and one or more sub-controllers (e.g., a battery pack control module, or BPCM) that collectively form the control system 116. As shown, the contactors 144 include three different contactors: (i) a pre-charge contactor 144a that selectively connects the low voltage battery system 148 to the high voltage bus 140 (e.g., for pre-charging) and (ii) a positive contactor 144b and (iii) a negative contactor 144c that collectively establish the connection between the high voltage battery system 136 and the high voltage bus 140. The monitoring system 156 monitors the voltage of the low voltage battery system 148, such as using one or more different voltage sensors and/or voltage models. The supervisory controller 208 is configured to detect a request to perform a high voltage connection procedure where the high voltage battery system 136 that is disconnected by a set of contactors 144b, 144c each in an open state is subsequently connected to the high voltage bus 140. This request, for example only, could be a request for one of (i) powering the electric motor(s) 128 for vehicle propulsion, (ii) recharging the high voltage battery system 136, and (iii) thermal conditioning of the high voltage battery system 136 and/or a cabin environment of the vehicle 100.

In response to detecting the request, the supervisory controller utilizes the monitoring system 156 to determine whether the low voltage battery system 148 has a voltage level sufficient to open/hold the set of contactors 144 during the high voltage connection procedure. When the low voltage battery system 148 has sufficient voltage, the supervisory controller 208 is configured to command the sub-controllers (e.g., BPCM) 212 to perform the high voltage connection procedure by (i) closing and holding close the pre-charge contactor 144a for a period, (ii) closing the positive contactor 144b, (iii) closing the negative contactor 144c when the high voltage bus 140 approaches the voltage level of the high voltage battery system 136, and (iv) then opening the pre-charge contactor 144a. When the low voltage battery system 148 does not have sufficient voltage, the supervisory controller 208 is configured to display, such as via the driver interface 120, a low voltage indicator for a user to recharge the low voltage battery system 148 before the high voltage connection procedure can occur. For example, the low voltage indicator could be illuminating a respective low voltage lamp/light on a dash or infotainment system of the driver interface 120. The supervisory controller 208 determination of whether or not to perform the high voltage connection procedure based on the monitoring of the voltage level of the low voltage battery system 148 prevents voltage fluctuations and current spikes that could cause one or more of the contactors 144 to weld closed thereby rendering the vehicle 100 inoperable. The low voltage battery system 148 does not include separate, on-board control logic for preventing the voltage fluctuations and current spikes that could cause one or more of the contactors 144 to weld closed.

Figure 3:
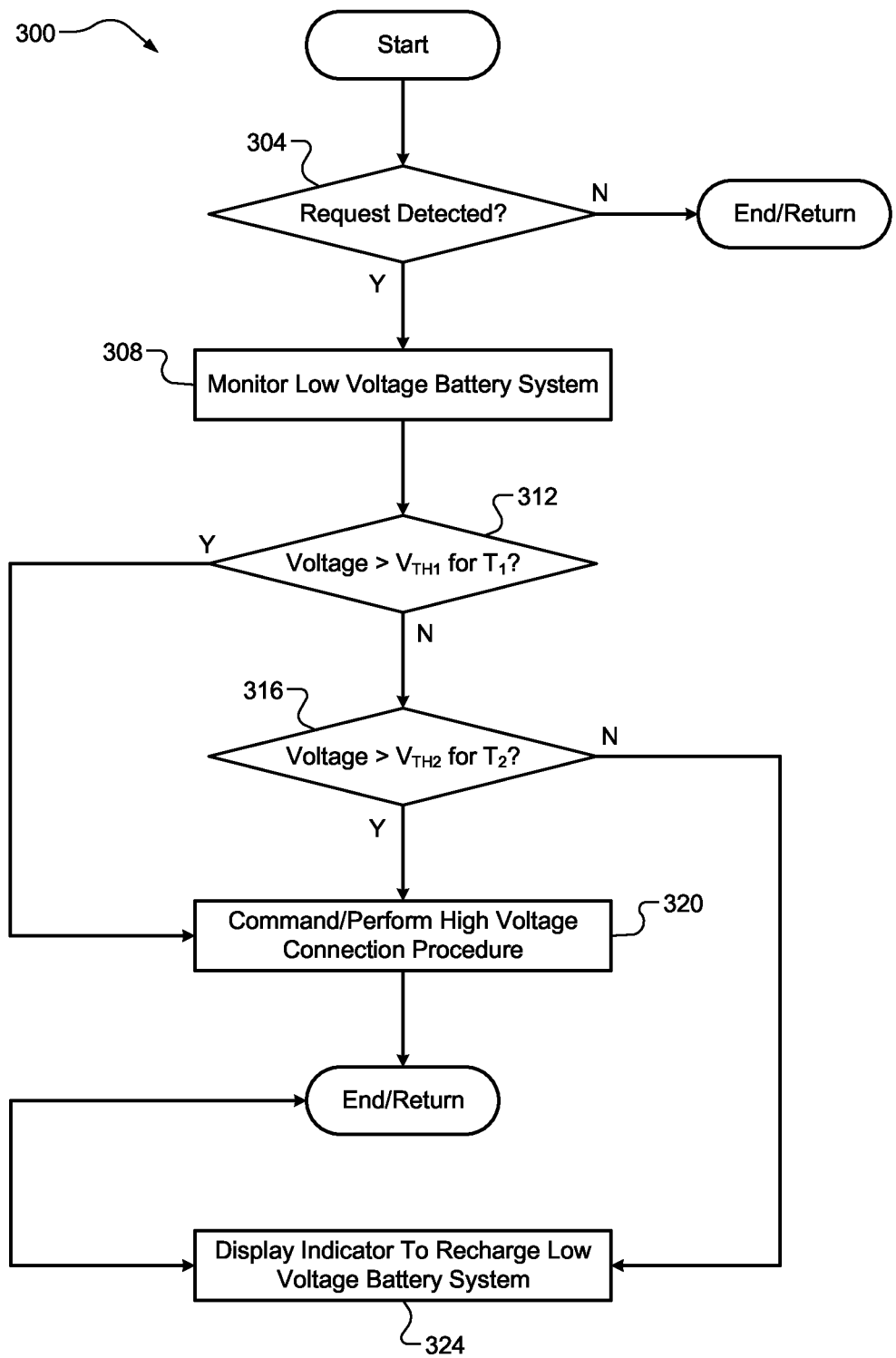
FIG. 3 is a flow diagram of an example high voltage battery contactor welding prevention method according to the principles of the present application.

Referring now to FIG. 3, a flow diagram of high voltage battery welding prevention method 300 for an electrified vehicle according to the principles of the present application is illustrated. While the components of vehicle 100 and FIGS. 1-2 are referenced for explanatory purposes, it will be appreciated that this method 300 could be applicable to any suitable electrified vehicle having a non-battery side high voltage battery welding prevention configuration. At 304, the supervisory controller 208 detects a request to perform the high voltage connection procedure. As previously mentioned, this could be, for example only, for one of (i) powering the electric motor(s) 128 for vehicle propulsion, (ii) recharging the high voltage battery system 136, and (iii) thermal conditioning of the high voltage battery system 136 and/or a cabin environment of the vehicle 100. When the request is detected, the method 300 proceeds to 308. Otherwise, the method 300 ends or returns to 304. At 308, in response to detecting the request, the supervisory controller 208 utilizes a monitoring system configured to monitor a voltage of the low voltage battery system to determine whether a low voltage battery system of the vehicle has a voltage level sufficient to open/hold the set of contactors 144 during the high voltage connection procedure. This could include, for example, determining whether the voltage level is greater than a first voltage ($V_{TH1}$) threshold and can be maintained for a first period ($T_1$) at 312. When true, the method 300 proceeds to 320. Otherwise, the method 300 proceeds to 316.

At 316, the supervisory controller 208 determines whether the voltage level is greater than a lesser second voltage threshold ($V_{TH2}$) and can be maintained for a longer second period ($T_2$). When true, the method 300 proceeds to 320. Otherwise, the method 300 proceeds to 324. In one exemplary implementation, the low voltage battery system 148 is a 12V battery system the first and second voltage thresholds are ~11.5 V and ~10.2 V, respectively. In one exemplary implementation, the first and second periods are ~100 milliseconds (ms) and ~200 ms, respectively. It will be appreciated that other values could be used depending on the particular application, and it will also be appreciated that a single threshold/period could be utilized or three or more pairs of thresholds/periods. At 320, the supervisory controller 208 determines that the low voltage battery system 148 has sufficient voltage and there after commands the sub-controllers (e.g., BPCM) 212 to perform the high voltage connection procedure by (i) closing and holding close the pre-charge contactor 144a for a period, (ii) closing the positive contactor 144b, (iii) closing the negative contactor 144c when the high voltage bus 140 approaches the voltage level of the high voltage battery system 136, and (iv) then opening the pre-charge contactor 144a. The method 300 then ends or returns to 304 (e.g., after a subsequent vehicle shut-down). At 324, the supervisory controller 208 determines that the low voltage battery system 148 does not have sufficient voltage and thereafter displays (e.g., via driver interface 120, such as a light/lamp on a dash or infotainment unit) a low voltage indicator for a user to recharge the low voltage battery system 148 before the high voltage connection procedure can occur. The method 300 then ends or returns to 304.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A high voltage battery contactor welding prevention system for an electrified vehicle, the contactor welding prevention system comprising:
   a monitoring system configured to monitor a voltage of a low voltage battery system of the vehicle, the low voltage battery system being connected to a high voltage bus associated with a high voltage battery system through a DC-DC converter; and
   a supervisory controller configured to:
      detect a request to perform a high voltage connection procedure where the high voltage battery system that is disconnected by a set of contactors each in an open state is subsequently connected to the high voltage bus;
      in response to detecting the request, utilize the monitoring system to determine whether the low voltage battery system has a voltage level sufficient to open/hold the set of contactors during the high voltage connection procedure;
      when the low voltage battery system has sufficient voltage, command a sub-controller to perform the high voltage connection procedure by (i) closing and holding close a pre-charge contactor for a period, (ii) closing a positive contactor, (iii) closing a negative contactor when the high voltage bus approaches the voltage level of the high voltage battery system, and (iv) then opening the pre-charge contactor; and
      when the low voltage battery system does not have sufficient voltage, display a low voltage indicator for a user to recharge the low voltage battery system before the high voltage connection procedure can occur.

2. The contactor welding prevention system of claim 1, wherein the supervisory controller determination of whether or not to perform the high voltage connection procedure based on the monitoring of the voltage level of the low voltage battery system prevents voltage fluctuations and current spikes that could cause one or more of the contactors to weld closed thereby rendering the electrified vehicle inoperable.

3. The contactor welding prevention system of claim 2, wherein the low voltage battery system does not include separate, on-board control logic for preventing the voltage fluctuations and current spikes that could cause one or more of the contactors to weld closed.

4. The contactor welding prevention system of claim 1, wherein the supervisory controller is configured to determine that the voltage level is sufficient to open/hold the set of contactors during the high voltage connection procedure by determining that the voltage level is greater than a first voltage threshold and can be maintained for a first period.

5. The contactor welding prevention system of claim 4, wherein the supervisory controller is configured to determine that the voltage level is sufficient to open/hold the set of contactors during the high voltage connection procedure by determining that the voltage level is greater than a lesser second voltage threshold and can be maintained for a longer second period.

6. The contactor welding prevention system of claim 5, wherein the low voltage battery system is a 12 volt (V) battery system, and wherein the first and second voltage thresholds are 11.5 V and 10.2 V, respectively.

7. The contactor welding prevention system of claim 6, wherein the first and second periods are 100 milliseconds (ms) and 200 ms, respectively.

8. The contactor welding prevention system of claim 1, wherein the supervisory controller is configured to display the low voltage indicator by illuminating a respective low voltage lamp/light on a dash or driver interface of the electrified vehicle.

9. The contactor welding prevention system of claim 1, wherein the request to connect the high voltage battery system corresponds to a request for one of (i) powering one or more electric motors for vehicle propulsion, (ii) recharging the high voltage battery system, and (iii) thermal conditioning of the high voltage battery system and/or a cabin environment of the electrified vehicle.

10. A high voltage battery contactor welding prevention method for an electrified vehicle, the method comprising:
    detecting, by a supervisory controller of the vehicle, a request to perform a high voltage connection procedure where a high voltage battery system of the vehicle that is disconnected by a set of contactors each in an open state is subsequently connected to a high voltage bus that is also connected to a low voltage battery system of the vehicle through a DC-DC converter;
    in response to detecting the request, utilizing, by the supervisory controller, a monitoring system configured to monitor a voltage of the low voltage battery system to determine whether a low voltage battery system of the vehicle has a voltage level sufficient to open/hold the set of contactors during the high voltage connection procedure;
    when the low voltage battery system has sufficient voltage, commanding, by the supervisory controller to a sub-controller, the high voltage connection procedure by (i) closing and holding close a pre-charge contactor for a period, (ii) closing a positive contactor, (iii) closing a negative contactor when the high voltage bus approaches the voltage level of the high voltage battery system, and (iv) then opening the pre-charge contactor; and
    when the low voltage battery system does not have sufficient voltage, displaying, by the supervisory controller, a low voltage indicator for a user to recharge the low voltage battery system before the high voltage connection procedure can occur.

11. The method of claim 10, wherein the supervisory controller determination of whether or not to perform the high voltage connection procedure based on the monitoring of the voltage level of the low voltage battery system prevents voltage fluctuations and current spikes that could cause one or more of the contactors to weld closed thereby rendering the electrified vehicle inoperable.

12. The method of claim 11, wherein the low voltage battery system does not include separate, on-board control logic for preventing the voltage fluctuations and current spikes that could cause one or more of the contactors to weld closed.

13. The method of claim 10, wherein the supervisory controller is configured to determine that the voltage level is sufficient to open/hold the set of contactors during the high voltage connection procedure by determining that the voltage level is greater than a first voltage threshold and can be maintained for a first period.

14. The method of claim 13, wherein the supervisory controller is configured to determine that the voltage level is sufficient to open/hold the set of contactors during the high voltage connection procedure by determining that the voltage level is greater than a lesser second voltage threshold and can be maintained for a longer second period.

15. The method system of claim 14, wherein the low voltage battery system is a 12 volt (V) battery system, and wherein the first and second voltage thresholds are 11.5 V and 10.2 V, respectively.

16. The method of claim 15, wherein the first and second periods are 100 milliseconds (ms) and 200 ms, respectively.

17. The method of claim 10, wherein the supervisory controller is configured to display the low voltage indicator by illuminating a respective low voltage lamp/light on a dash or driver interface of the electrified vehicle.

18. The method of claim 10, wherein the request to connect the high voltage battery system corresponds to a request for one of (i) powering one or more electric motors for vehicle propulsion, (ii) recharging the high voltage battery system, and (iii) thermal conditioning of the high voltage battery system and/or a cabin environment of the electrified vehicle.

* * * * *